US012723755B2

(12) United States Patent
Seeley et al.

(10) Patent No.: US 12,723,755 B2
(45) Date of Patent: Sep. 1, 2026

(54) MODULAR ABATEMENT APPARATUS

(71) Applicant: Edwards Limited, Burgess Hill (GB)

(72) Inventors: Andrew James Seeley, Clevedon (GB); David Frederick Bartz, San Jose, CA (US); Michael Jay Silberstein, San Jose, CA (US)

(73) Assignee: Edwards Limited, Burgess Hill (GB)

( * ) Notice: Subject to any disclaimer, the term of this patent is extended or adjusted under 35 U.S.C. 154(b) by 456 days.

(21) Appl. No.: 18/576,268

(22) PCT Filed: Jul. 7, 2022

(86) PCT No.: PCT/GB2022/051745
§ 371 (c)(1),
(2) Date: Jan. 3, 2024

(87) PCT Pub. No.: WO2023/285779
PCT Pub. Date: Jan. 19, 2023

(65) Prior Publication Data

US 2024/0310041 A1 Sep. 19, 2024

(30) Foreign Application Priority Data

Jul. 13, 2021 (GB) ..................................... 2110048

(51) Int. Cl.
*F23G 7/06* (2006.01)
*B01D 53/00* (2006.01)

(52) U.S. Cl.
CPC ........... *F23G 7/065* (2013.01); *B01D 53/005* (2013.01); *B01D 2258/0216* (2013.01); *F23G 2209/142* (2013.01)

(58) Field of Classification Search
CPC . F23G 7/065; F23G 2209/142; B01D 53/005; B01D 2258/0216; B01D 53/70;
(Continued)

(56) References Cited

U.S. PATENT DOCUMENTS 4,764,105 A 8/1988 McElroy
6,234,787 B1 * 5/2001 Endoh .................... F23G 7/065 110/238

(Continued)

FOREIGN PATENT DOCUMENTS

CA 2629127 C 2/2011
CN 2487438 Y 4/2002

(Continued)

OTHER PUBLICATIONS

Japanese Notification of Reason for Rejection dated Mar. 24, 2025 for corresponding Japanese application Serial No. 2024-501521, 7 pages.

(Continued)

*Primary Examiner* — David J Laux
(74) *Attorney, Agent, or Firm* — Theodore M. Magee; Westman, Champlin & Koehler, P.A.

(57) ABSTRACT

A modular abatement apparatus is for abatement of an effluent stream from a semiconductor processing tool and comprises: a housing defining a common housing chamber; a plurality of combustion chamber modules positionable within the common housing chamber for treating the effluent stream, each combustion chamber module containing a foraminous sleeve defining a combustion chamber therewithin. In this way, multiple combustion chambers may be provided within a single, common housing, each of which may be configured to treat a particular effluent stream flow. Accordingly, the number of combustion chambers can be selected to match the different types and flowrates of the effluent stream expected from any particular processing tool. This provides an architecture which is readily scalable to suit the needs of different effluent gas stream types and flowrates while retaining a common housing which may interface with upstream and downstream components.

15 Claims, 5 Drawing Sheets

(58) Field of Classification Search
CPC .......... F23D 14/02; F23D 14/12; F23D 14/16; F23J 2219/40
See application file for complete search history.

(56) References Cited

U.S. PATENT DOCUMENTS

| | | | | |
|---|---|---|---|---|
| 8,293,184 | B2 * | 10/2012 | Moore | H10P 72/0462 422/186.04 |
| 10,161,628 | B2 | 12/2018 | Seeley | |
| 2005/0135984 | A1 * | 6/2005 | Ferron | F23G 7/061 422/171 |
| 2007/0217983 | A1 * | 9/2007 | Stanton | B01D 53/68 422/111 |
| 2010/0116140 | A1 * | 5/2010 | Arai | B01D 53/8662 96/252 |
| 2013/0287637 | A1 | 10/2013 | Vickery | |
| 2013/0305970 | A1 | 11/2013 | Kim | |
| 2014/0106282 | A1 | 4/2014 | Kim et al. | |
| 2015/0000870 | A1 * | 1/2015 | Hosotani | F02C 7/08 165/104.19 |
| 2016/0076769 | A1 | 3/2016 | Stanton et al. | |
| 2016/0169508 | A1 | 6/2016 | Bell | |
| 2017/0144092 | A1 * | 5/2017 | Seeley | B04B 5/10 |
| 2018/0311607 | A1 * | 11/2018 | Price | B01D 53/005 |
| 2020/0038796 | A1 * | 2/2020 | Fekety | C03B 19/106 |
| 2021/0057236 | A1 * | 2/2021 | Sekine | H10P 72/0402 |
| 2022/0016572 | A1 * | 1/2022 | Lampert | B01D 53/346 |
| 2022/0373175 | A1 * | 11/2022 | Price | F23G 7/065 |

FOREIGN PATENT DOCUMENTS

| | | | |
|---|---|---|---|
| CN | 1993170 | A | 7/2007 |
| CN | 105408689 | A | 3/2016 |
| CN | 206240259 | U | 6/2017 |
| CN | 107850299 | A | 3/2018 |
| CN | 108291716 | A | 7/2018 |
| CN | 108715436 | A | 10/2018 |
| CN | 213159427 | U | 5/2021 |
| EP | 0694735 | A1 | 1/1996 |
| EP | 1129763 | A1 | 9/2001 |
| EP | 2079961 | B1 | 12/2015 |
| GB | 2550382 | A | 11/2017 |
| GB | 2584675 | A | 12/2020 |
| JP | S58184421 | U | 12/1983 |
| JP | H1054534 | A | 2/1998 |
| JP | H10148309 | A | 6/1998 |
| JP | 2005522660 | A | 7/2005 |
| JP | 2006170603 | A | 6/2006 |
| JP | 2008519959 | A | 12/2008 |
| JP | 2016011759 | A | 1/2016 |
| JP | 2017211100 | A | 11/2017 |
| JP | 2021502518 | A | 1/2021 |
| TW | 201138931 | A | 11/2011 |
| TW | 201418629 | A | 5/2014 |
| WO | 0161245 | A1 | 8/2001 |
| WO | 2007053626 | A2 | 5/2007 |
| WO | 2008122819 | A1 | 10/2008 |
| WO | 2010054291 | A1 | 5/2010 |
| WO | 2016156811 | A1 | 10/2016 |
| WO | 2017037419 | A1 | 3/2017 |
| WO | 2018129111 | A1 | 7/2018 |
| WO | 2023285778 | A1 | 1/2023 |
| WO | 2023285780 | A1 | 1/2023 |
| WO | 2023285781 | A1 | 1/2023 |

OTHER PUBLICATIONS

Japanese Notification of Reason for Rejection dated Feb. 17, 2025 for corresponding Japanese application Serial No. 2024-501172, 7 pages.

Japanese Notification of Reason for Rejection dated Feb. 27, 2025 for corresponding Japanese application Serial No. 2024-501522, 9 pages.

Non-Final Office Action dated Mar. 23, 2026 for corresponding U.S. Appl. No. 18/576,592, 24 pages.

Non-Final Office Action dated Apr. 7, 2026 for corresponding U.S. Appl. No. 18/577,018, 28 pages.

Non-Final Office Action dated Apr. 8, 2026 for corresponding U.S. Appl. No. 18/578,171, 26 pages.

Chinese Office Action dated Apr. 16, 2026 and Search Report dated Apr. 15, 26 for corresponding Chinese application Serial No. 2022800496870, 9 pages.

Chinese Office Action dated Apr. 15, 2026 and Search Report dated Apr. 16, 2026 for corresponding Chinese application Serial No. 202280049686.6, 12 pages.

Chinese Office Action dated Mar. 25, 2026 and Search Report dated Apr. 19, 2026 for corresponding Chinese application Serial No. 2022800496743, 11 pages.

Taiwanese Office Action and Search Report dated Apr. 2, 2026 for corresponding Taiwanese application Serial No. 111125527, 13 pages.

Taiwanese Search Report dated Jan. 13, 2026 for corresponding Taiwanese application Serial No. 111125451, 1 page.

British Examination Report dated Apr. 27, 2022 and Search Report dated Apr. 12, 2022 for corresponding British Application No. GB2110048.2, 9 pages.

PCT Notification of Transmittal of the International Search Report and the Written Opinion of the International Searching Authority, or the Declaration and PCT Search Report dated Sep. 21, 2022 for corresponding PCT application Serial No. PCT/GB2022/051745, 11 pages.

British Examination Report dated Apr. 8, 2022 and Search Report dated Apr. 1, 2022 for corresponding British Application No. GB2110049.0, 10 pages.

PCT Notification of Transmittal of the International Search Report and the Written Opinion of the International Searching Authority, or the Declaration and PCT Search Report dated Sep. 21, 2022 for corresponding PCT application Serial No. PCT/GB2022/051746, 11 pages.

British Examination Report dated Apr. 27, 2022 and Search Report dated Apr. 12, 2022 for corresponding British Application No. GB2110051.6, 11 pages.

PCT Notification of Transmittal of the International Search Report and the Written Opinion of the International Searching Authority, or the Declaration and PCT Search Report dated Sep. 21, 2022 for corresponding PCT application Serial No. PCT/GB2022/051744, 11 pages.

British Examination Report dated Apr. 8, 2022 and Search Report dated Apr. 6, 2022 for corresponding British Application No. GB2110047.4, 10 pages.

* cited by examiner

MODULAR ABATEMENT APPARATUS

CROSS-REFERENCE OF RELATED APPLICATION

This application is a Section 371 National Stage Application of International Application No. PCT/GB2022/051745, filed Jul. 7, 2022, and published as WO 2023/285779A1 on Jan. 19, 2023, the content of which is hereby incorporated by reference in its entirety and which claims priority of British Application No. 2110048.2, filed Jul. 13, 2021.

FIELD

The field of the invention relates to a modular abatement apparatus and a method.

BACKGROUND

Abatement apparatus, such as radiant burners, are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream, such as that described in EP 0 694 735. Typically, the effluent gas stream is a nitrogen stream containing PFCs and other compounds. The effluent stream is conveyed into a combustion chamber that is laterally surrounded by the exit surface of a foraminous gas burner. In some cases treatment materials, such as fuel gas, can be mixed with the effluent gas stream before entering the combustion chamber. Fuel gas and air are simultaneously supplied to the foraminous burner to affect combustion at the exit surface. The products of combustion from the foraminous burner react with the effluent stream mixture to combust compounds in the effluent stream.

Although techniques exist for processing the effluent gas stream, they each have their own shortcomings. Accordingly, it is desired to provide an improved technique for processing an effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a modular abatement apparatus for abatement of an effluent stream from a semiconductor processing tool, comprising: a housing defining a common housing chamber; a plurality of combustion chamber modules positionable within the common housing chamber for treating the effluent stream, each combustion chamber module containing a foraminous sleeve defining a combustion chamber therewithin.

The first aspect recognises that a problem with existing abatement apparatus configurations is that they are not easily scalable to deal with different types and/or quantities of effluent streams. That is to say, each abatement apparatus is typically designed to deal with a specific effluent stream and flow rate, and that design is then validated through testing. Also, where intermittent effluent streams are provided, different abatement apparatus are typically provided, which are put in active and idle modes in response to those intermittent effluent streams. Those different abatement apparatus are typically provided with their own downstream processing apparatus and this can lead to larger than desired installations. Also, should a different effluent stream flowrate need to be treated, then a new design is typically required, which then needs to be validated. Although some standard parts can be re-used, each design is therefore essentially unique and the underlying architecture of existing arrangements has scalability limits.

Accordingly, an abatement apparatus may be provided. The abatement apparatus may be a modular abatement apparatus. The apparatus may abate or treat an effluent or process stream from a semiconductor processor tool. The apparatus may comprise a housing or enclosure which defines a common, shared or unitary housing chamber. The apparatus may comprise a plurality of combustion chamber modules or units. The combustion chamber modules may be positionable or locatable within or inside the common housing chamber. Each combustion chamber module may contain or house a foraminous or porous sleeve or jacket. The sleeve may define, surround or enclose the combustion chamber. In other words, each combustion chamber module may be unitary and may provide its own combustion chamber. In this way, multiple combustion chambers may be provided within a single, common housing, each of which may be configured to treat a particular effluent stream flow. Accordingly, the number of combustion chambers can be selected to match the different types and flowrates of the effluent stream expected from any particular processing tool. This provides an architecture which is readily scalable to suit the needs of different effluent gas stream types and flowrates while retaining a common housing which may interface with upstream and downstream components.

The foraminous sleeve may be unitary or formed from a single, continuous component.

The combustion chamber may be shaped and/or dimensioned to occupy a module cross-sectional area and the common housing chamber may be shaped and/or dimensioned to extend across a plurality of the module cross-sectional areas. In other words, a combustion chamber module may be considered to occupy a single unit of predefined cross-sectional area and the common housing chamber may be designed to provide a space for multiple of those units of cross-sectional area.

The common housing chamber may be shaped and/or dimensioned to extend across a plurality of adjacent module cross-sectional areas.

The common housing chamber may be shaped and/or dimensioned to extend across an array of N×M of adjacent module cross-sectional areas.

N may equal M. Hence, the array may be a square array.

N may not equal M. Hence, the array may be a rectangular array.

The common housing chamber may be shaped and/or dimensioned to extend across the plurality of the module cross-sectional areas and a pilot module cross-sectional area. In other words, the common housing chamber may accommodate both the plurality of combustion chamber modules and the pilot module.

The common housing chamber may have a head plate. The head plate may define an upstream surface of the housing chamber. The head plate may have a plurality of effluent stream inlets. Each of the effluent stream inlets may be positioned towards a centre or away from a perimeter of a corresponding module cross-sectional area. In other words, for each designated cross-sectional area within the housing chamber, at least one effluent stream inlet may be provided which may be positioned away from the perimeter of the module cross-sectional area in order to deliver the effluent stream towards a centre of the its combustion chamber and away from the foraminous sleeve.

The head plate may have a plurality of treatment material inlets. Each treatment material inlet may be positioned towards a perimeter or away from a centre of a corresponding module cross-sectional area. This helps to deliver the treatment materials to the vicinity of the foraminous sleeve.

The head plate may comprise a purge inlet. The purge inlet may be configured to deliver a purge gas. The purge gas may be delivered to an interspace or void within the common housing chamber which is between the plurality of combustion chamber modules. This helps to prevent the build-up of residues between the combustion chamber modules.

The head plate may comprise a gallery. The gallery may be in fluid communication with the purge inlet to deliver or convey the purge gas to the interspaces within the common housing chamber between the plurality of combustion chamber modules.

The plurality of combustion chamber modules may be releasably or removably retainable or fixable within the common housing chamber. This allows the combustion chambers to be removed or replaced when required, to enable the apparatus to be repaired or reconfigured.

The plurality of combustion chamber modules may have a releasable securing mechanism which may be configured to releasably engage or fix with a complimentary releasable securing mechanism within the common housing chamber. Accordingly, each combustion chamber module may be individually fixed into and released from the common housing chamber.

The plurality of combustion chambers may be positionable within the common housing chamber to be adjacent or abutting each other. This enables the combustion chambers to be tightly packed within the space provided by the common housing chamber.

The plurality of combustion chamber modules may be tessellatable within the common housing chamber. This reduces gaps between combustion chamber modules and increases packing density within the common housing chamber.

The plurality of combustion chamber modules may be of differing sizes. That is to say, combustion chamber modules of differing cross-sectional areas may be provided. This enables differing sized combustion chamber modules to be provided for differing effluent stream requirements.

Each combustion chamber may be shaped and/or dimensioned to occupy a multiple of the module cross-sectional area. That is to say, if a module is intended to occupy a unit of cross-sectional area, each combustion chamber module is shaped and/or dimensioned to occupy a (typically integer) multiple number of that unit of cross-sectional area. This helps to ensure that even when using combustion chamber modules of differing sizes, the plurality of differing sized combustion chamber modules still fit within the common housing chamber.

At least one combustion chamber module may be a multiple sized combustion chamber module which is shaped and/or dimensioned to occupy a plurality of module cross-sectional areas.

The multiple sized combustion chamber module may be shaped and/or dimensioned to occupy an array of P×Q of adjacent module cross-sectional areas.

P may equal Q. In other words, the multiple sized combustion chamber module may be square.

P may not equal Q. In other words, the multiple sized combustion chamber module may be rectangular.

Each combustion chamber module may contain its foraminous sleeve which surrounds that combustion chamber. In other words, each combustion chamber module may contain a foraminous sleeve which defines a complete combustion surface of that combustion chamber.

Each combustion chamber module may comprise a module housing. The module housing may be positioned or located away from the foraminous sleeve. The module housing may surround the foraminous sleeve. The module housing may define a combustion chamber plenum which is configured to convey the treatment materials from a corresponding treatment material inlet, through the foraminous sleeve and into the corresponding combustion chamber. Hence, each individual combustion chamber may be provided with its own treatment materials via the plenum formed within the module housing of the combustion chamber module.

Each combustion chamber may be tubular. It will be appreciated that tubes of various different cross-sectional shapes are possible, including circular, non-circular, rectilinear and polygonal.

Each combustion chamber may comprise an outlet for conveying a treated effluent stream to downstream processing apparatus. In other words, the effluent stream treated within the combustion chamber may be exhausted through an outlet to a downstream processing apparatus. This enables a common downstream processing apparatus to be provided for all the combustion chambers, rather than requiring a dedicated downstream processing apparatus to be provided for each combustion chamber.

At least one combustion chamber module may comprise a combustion chamber mount through which a corresponding effluent stream inlet may extend. The combustion chamber mount may convey the effluent stream and treatment materials from the head plate to the combustion chamber plenum. The mount may be made from lower temperature and less corrosion resistant materials than the combustion chamber. The combustion chamber mount may be dimensioned to reduce or change an internal length of that combustion chamber compared to other combustion chambers. Typically, the mount can be used to shorten the length of the combustion chamber between the effluent stream inlet and the outlet in order to provide for combustion chambers of differing characteristics all still housed within a common housing chamber.

The common housing chamber may be provided with walls which are configured to extend around the plurality of combustion chamber modules. The walls may extend from the head plate to the downstream processing apparatus.

The downstream processing apparatus may comprise a weir. The weir may be located downstream of the common housing chamber. The weir may have a cross-sectional area which matches, or is similar to, that of the common housing chamber. This enables the common housing chamber which retains the plurality of combustion chamber modules to be located on the weir, which provides for a compact arrangement and enables the combustion chambers modules to share the weir for downstream processing.

Each combustion chamber module may be dimensioned to extend from the common housing chamber and at least partially into the weir.

The apparatus may comprise at least one blanking, filling or packing module which may be positioned within the common housing chamber adjacent or abutting at least one combustion chamber module. Accordingly, a blanking module may be located within the common housing chamber, should no combustion chamber be required at that location. This provides for a flexible and reconfigurable apparatus.

The blanking module may comprise a blanking plate. The blanking plate may extend across the blanking module. The blanking plate may be aligned with the outlet. The blanking plate therefore effectively obscures the void filled by the blanking module. The blanking plate may comprise a foraminous surface. That foraminous surface may convey combustion reagents for combustion thereon or may convey a purge gas to provide a purged surface.

The apparatus may comprise logic operable to control the plurality of treatment material inlets. The control logic may control the plurality of treatment material inlets at independently, together and/or in groups.

The control logic may be operable to control the plurality of effluent stream inlets. The control logic may be operable to control the plurality of effluent stream inlets independent, together and/or in groups.

According to a second aspect, there is provided a method comprising dimensioning a housing defining a common housing chamber; positioning a plurality of combustion chamber modules within the common housing chamber for treating the effluent stream, each combustion chamber module containing a foraminous sleeve defining a combustion chamber therewithin.

The method may comprise shaping and dimensioning at least one combustion chamber module to occupy a module cross-sectional area and shaping and dimensioning the common housing chamber to extend across at least a plurality of the module cross-sectional areas.

The method may comprise shaping and dimensioning the common housing chamber to extend across at least a plurality of adjacent module cross-sectional areas.

The method may comprise shaping and dimensioning the common housing chamber to extend across at least an array of N×M of adjacent module cross-sectional areas.

N may equal M.

N may not equal M.

The method may comprise shaping and dimensioning the common housing chamber to extend across a plurality of the module cross-sectional areas and a pilot module cross-sectional area.

The method may comprise providing a head-plate defining an upstream surface the housing chamber and positioning a plurality of effluent stream inlets in the head-plate, each being positioned towards a centre of a corresponding module cross-sectional area.

The method may comprise providing a plurality of treatment material inlets in the head-plate, each being positioned towards a perimeter of a corresponding module cross-sectional area.

The method may comprise providing a purge inlet in the head-plate configured to deliver a purge gas to an interspace within the common housing chamber between the plurality of combustion chamber modules.

The method may comprise providing a gallery in the head-plate which is in fluid communication with the purge inlet to deliver the purge gas to the interspace within the common housing chamber between the plurality of combustion chamber modules.

The method may comprise releasably retaining the plurality of combustion chamber modules within the common housing chamber.

The method may comprise providing a releasable securing mechanism on each combustion chamber configured to releasably engage with a complementary releasable securing mechanism within the common housing chamber.

The method may comprise positioning the plurality of combustion chamber modules within the common housing chamber adjacent each other.

The method may comprise tessellating the plurality of combustion chamber modules within the common housing chamber.

The method may comprise providing combustion chamber modules of differing sizes.

The method may comprise shaping and dimensioning each combustion chamber module to occupy a multiple of the module cross-sectional area.

The method may comprise providing at least one combustion chamber module as a multiple-sized combustion chamber module shaped and dimensioned to occupy a plurality of module cross-sectional areas.

The method may comprise shaping and dimensioning the multiple-sized combustion chamber module to occupy an array of P×Q of adjacent module cross-sectional areas.

P may equal Q.

P may not equal Q.

The method may comprise providing within each combustion chamber module the foraminous sleeve which surrounds that combustion chamber.

The method may comprise providing each combustion chamber module with a module housing positioned away from and surrounding the foraminous sleeve to define a combustion chamber plenum which is configured to convey treatment materials from a corresponding treatment material inlet and through that foraminous sleeve into that combustion chamber.

The method may comprise shaping each combustion chamber module to be tubular.

The method may comprise providing each combustion chamber module with an outlet for conveying a treated effluent stream to downstream processing apparatus.

The method may comprise providing at least one combustion chamber module with a combustion chamber mount through which a corresponding effluent stream inlet extends and dimensioning the combustion chamber mount to reduce an internal length of that combustion chamber compared to other combustion chambers.

The common housing chamber may comprise walls which extend around the plurality of plurality of combustion chamber modules, the wall extending from the head plate to the downstream processing apparatus.

The method may comprise providing a weir having a cross-sectional area matching that of the common housing chamber as the downstream processing apparatus located downstream of the common housing chamber.

The method may comprise dimensioning each combustion chamber module to extend from the common housing chamber at least partially into the weir.

The method may comprise positioning at least one blanking module within the common housing chamber adjacent at least one combustion chamber module.

The method may comprise providing the blanking module with a blanking plate extending across the blanking module and aligned with the outlet.

The method may comprise controlling the plurality of treatment material inlets at independently, together and/or in groups.

The method may comprise controlling the plurality of effluent stream inlets independently, together and/or in groups.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which:

FIGS. 4A-J, illustrate schematically different configurations of housings and combustion chamber modules;

DETAILED DESCRIPTION

Figure 1:
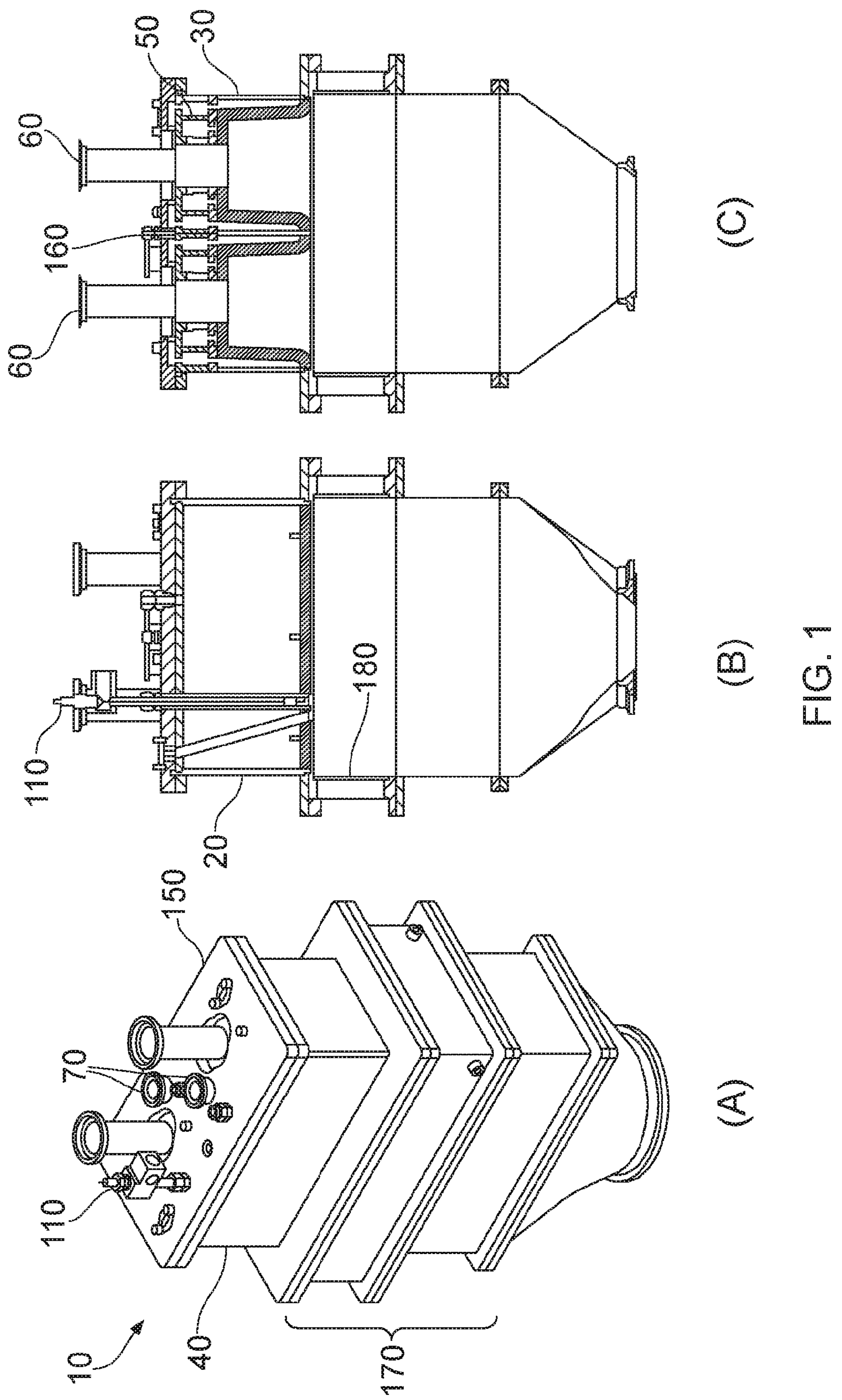
FIG. 1A is a perspective view of components of a modular abatement apparatus according to one embodiment.
FIG. 1B is a sectional view through FIG. 1A providing a sectional view of a pilot module 20.
FIG. 1C is a cross-sectional view through FIG. 1A providing a sectional view of combustion chamber modules.
FIG. 1D is sectional view showing the combustion chamber modules in more detail.

Before discussing the embodiments in any more detail, first an overview will be provided. Some embodiments provide a modular arrangement for an abatement apparatus. This modular arrangement allows for different configurations of abatement apparatus to be produced to suit different types of effluent streams and/or different quantities or flowrates of those effluent streams using a standardised set of components. A building block of this architectural approach is to start with a combustion chamber module which is sized as a standard unit, typically sized to process a typical or a minimal or selected amount of effluent stream. Each combustion chamber module is essentially self-contained receiving its own effluent stream and having its own foraminous sleeve defining its own combustion chamber for treatment of that effluent stream using treatment materials such as fuel and an oxidant which combust on that foraminous sleeve. A common housing is provided which is sized to enable multiple of those standard unit size combustion chambers to be incorporated.

In a simple arrangement, the common housing is formed to fit an array of combustion chamber modules together within that housing. In that simple arrangement, each of the combustion chamber modules have an identical cross-sectional area, meaning that they each occupy the same cross-sectional space within the common housing chamber. A head plate of the common housing can then be configured to deliver an effluent stream towards the centre of each of those combustion chambers and treatment materials to the foraminous sleeve of each combustion chamber module.

In another arrangement, the combustion chamber modules have differing cross-sectional areas, meaning that they each occupy a differing cross-sectional space within the common housing chamber and so are optimised to treat different effluent streams and/or flow rates. For example, combustion chambers which are one and a half, double, triple, quadruple, and so on the size of a standard unit combustion chamber module may be provided. Again, these combustion chamber modules may be in a linear or arrayed configuration. However, the head plate configuration can still remain the same and in, for example, a double-sized combustion chamber module, two effluent stream inlets may then be provided which deliver the effluent stream away from the foraminous sleeve of that combustion chamber. Furthermore, two treatment material inlets may feed the foraminous sleeve with treatment materials. This allows the same common housing chamber to be filled with different numbers of larger combustion chamber modules or with differing sized combustion chamber modules. This provides for design flexibility, whilst still retaining a small number of common parts.

The effective length of each combustion chamber can be varied by varying the depth of a mount on the headplate used to mount that combustion chamber within the common housing chamber, but with the discharge opening of each combustion chamber still being aligned. Similarly, blanking modules may be incorporated within the housing to fill a space or void where the full capacity of the common housing chamber is not required. The blanking modules may provide an ignited or purged foraminous surface. Again, this provides for a customizable apparatus which uses a minimal number of common parts.

This arrangement provides for self-contained combustion chambers within the common housing chamber, each of which can be operated and controlled individually without affecting the operation of other combustion chamber modules. Also, each of the combustion chamber modules can be individually removed and/or replaced. It can be seen that this arrangement allows for a variety of different configurations to be provided using a common set of components.

Abatement Apparatus

Figure 1D:
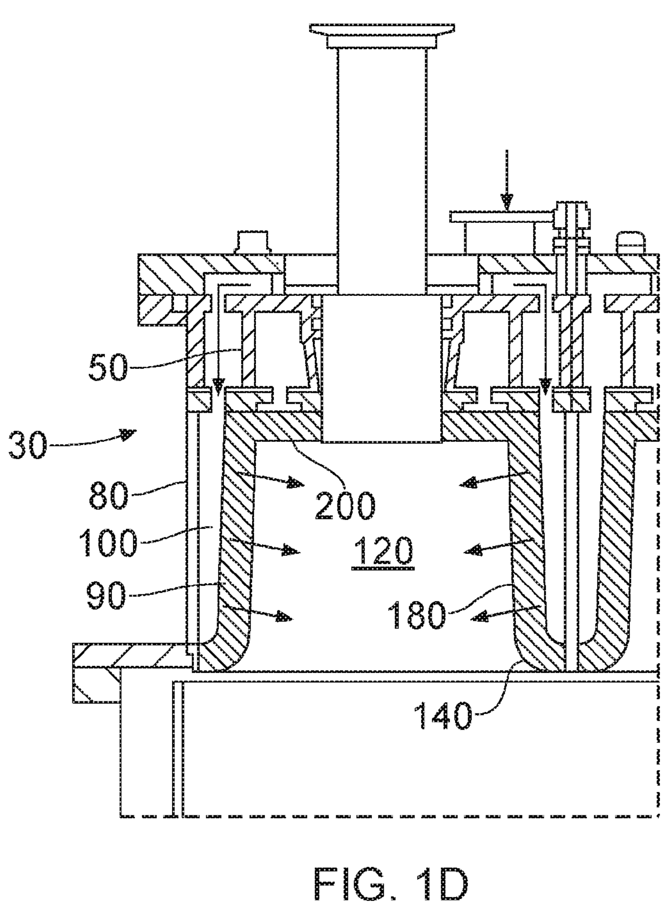

FIG. 1A is a perspective view of components of a modular abatement apparatus 10 according to one embodiment. FIG. 1B is a sectional view through FIG. 1A providing a sectional view of a pilot module 20. FIG. 1C is a cross-sectional view through FIG. 1A providing a sectional view of the combustion chamber modules 30. FIG. 1D is sectional view showing the combustion chamber modules 30 in more detail.

Figure 2:
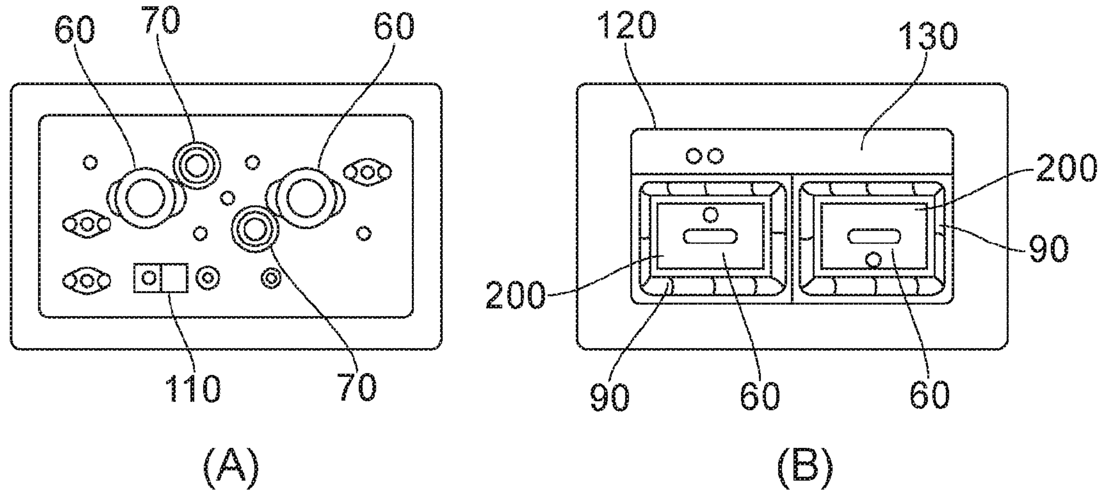
FIG. 2A illustrates a headplate in more detail.
FIG. 2B is a view from downstream of the combustion chamber modules.

A housing 40 is provided which defines a common housing chamber within which combustion chamber modules 30 are provided. A common headplate 150 is provided which covers an upstream opening of the housing 40. As can be seen in FIG. 2A, the headplate 150 receives effluent stream inlets 60 for supplying an effluent stream, treatment material inlets 70 for supplying treatment materials such as fuel, a pilot module inlet 110 for supplying fuel and a purge inlet 160 for supplying an inter-module purge gas such as nitrogen. Downstream of the housing 40 is a weir 170 which defines a wetted wall chamber 180 which in operation has walls over which a fluid such as water flows. In this example, there are two combustion chamber modules 30 arranged linearly within the housing 40, however as will be explained in more detail below, different configurations and numbers of combustion chamber modules 30 are possible which share a common housing and common headplate.

Between the headplate 150 and the combustion chamber modules 30 is provided a mount 50 which retains the combustion chamber modules 30 in place within the housing 40. The depth of this mount 50 can vary to accommodate different length combustion chamber modules 30 while still ensuring that each combustion chamber modules 30 discharges at the same position into the weir 170.

The combustion chamber module 30 has a module housing 80 within which is fitted a foraminous sleeve 90. The foraminous sleeve 90 defines a combustion chamber 120 within which the supplied effluent stream is treated. Each combustion chamber module 30 is provided with an effluent stream inlet 60 which conveys an effluent stream to be treated into the combustion chamber of that combustion chamber module 30. The foraminous sleeve 90 is spaced away slightly from the module housing 80 to define a plenum 100. Treatment material inlets 70 convey treatment materials such as fuel through the mount 50 and into the plenum 100 of the respective combustion chamber module 30. Hence, each combustion chamber module 30 is essentially self-contained and its operation has no effect on other combustion chamber modules 30 within the housing 40.

FIG. 2B shows a view from downstream of the combustion chamber modules 30. As can also be seen also be seen in FIG. 1D, the foraminous sleeve 90 has a planar upstream ceiling 200 from which depends four diverging walls 180 which terminate with a rounded shoulder 140 at a discharge end of the combustion chamber 120. This forms a combustion chamber 120 having a generally trapezoidal configuration. The pilot module 20 has a downstream discharge surface 130 which abuts the shoulder 140 of the foraminous sleeves 90.

Figure 3:
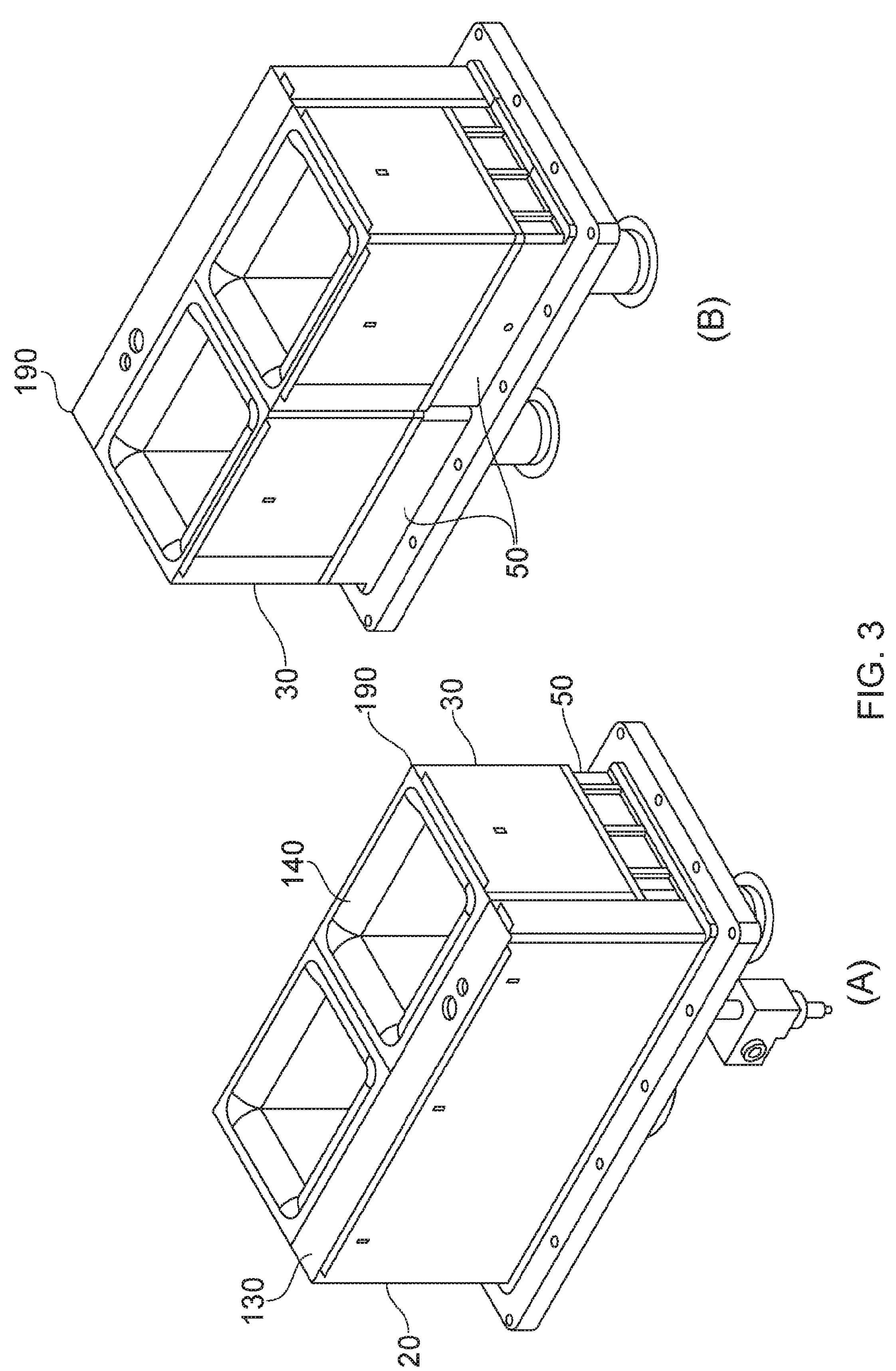
FIGS. 3A and 3B show the arrangement of the combustion chamber modules and the pilot module in more detail, with the housing removed.

FIGS. 3A and 3B show the arrangement of the combustion chamber modules 30 and the pilot module 20 in more detail, with the housing 40 removed. In this example, the combustion chamber modules 30 are of equal length and so the mounts 50 are of equal height. In order to protect the shoulders 140 and the discharge surface 130 from damage during assembly, they are provided with protrusions 190 which allow the combustion chamber modules 30 and the pilot module 20 to be placed on a surface without contacting the shoulders 140 and the discharge surface 130.

Housing and Combustion Chamber Module Configurations

As can be seen in FIG. 4A, the housing 40 is configured to house two combustion chamber modules 30 and the pilot module 20. The combustion chamber modules 30 are considered to be of a unit size and so the housing 40 is dimensioned to provide space for a linear arrangement or 2×1 array of the combustion chamber modules together with the pilot module 20. This configuration is useful when two separate effluent streams are required to be treated independently of each other. As can be seen in FIG. 4B, the same size housing 40 can also accommodate a single combustion chamber module 30' which is dimensioned to occupy 2×1 units of space together with the pilot module 20. This configuration is useful when a larger flow effluent stream is required to be treated. Hence, it can be seen that the same housing 40 can accommodate two separate combustion chamber modules 30 or alternatively accommodate a single larger combustion chamber module 30'.

As can be seen in FIG. 4C, a larger housing 40A may be provided which accommodates a 2×2 array of combustion chamber modules 30, together with a pilot module 20. As can be seen in FIG. 4D, the same housing 40A can accommodate a yet larger combustion chamber module 30" which is dimensioned to occupy 2×2 units of space. Alternatively, it will be appreciated that the housing 40A could also accommodate two combustion chamber modules 30' or combinations the larger combustion chamber module 30' and the combustion chamber module 30, as shown in FIGS. 4E and 4F.

FIG. 4G shows an arrangement of a housing 40B dimensioned to accommodate an array of 2×3 combustion chamber modules 30, together with a pilot module 20. As can be seen in FIG. 4H, larger size combustion chambers 30' together with combustion chamber modules 30 may be placed within the housing 40B, as required. It will be appreciated that the housing 40B could also accommodate combinations of the combustion chamber modules 30, the larger combustion chamber modules 30' and/or the yet larger combustion chamber modules 30". Also, it will be appreciated that further larger combustion chamber modules may be provided.

As can be seen in FIG. 4I, a housing 40C may be dimensioned to accommodate an array of 2×4 combustion chamber modules 30, together with a pilot module 20. As can be seen in FIG. 4J, some of those combustion chamber modules 30 can be replaced with larger modules such as one or more combustion chamber modules 30'. It will be appreciated that the housing 40C could also accommodate combinations of the combustion chamber modules 30, the larger combustion chamber modules 30' and/or the yet larger combustion chamber modules 30". Also, it will be appreciated that further larger combustion chamber modules may be provided.

The housings 40A-C may omit space for the pilot module 20 when an alternative pilot arrangement is provided, such as individual pilots for each combustion chamber module. Although in this example the combustion chamber modules and housing have a quadrilateral shape, it will be appreciated that other shapes are possible enable the which combustion chamber modules to fit within the housing, Tessellated combustion chamber modules are particularly space efficient and provide for minimal inter-combustion chamber module space to be purged. Also, combinations of housings 40A-C may be collocated to provide larger abatement apparatus.

Hence, it can be seen that a combustion chamber module 30 can be dimensioned to provide a combustion chamber 120 which is suited to process a minimal or typical effluent stream flow and that a housing 40 can be dimensioned to accommodate any number of these combustion chamber modules 30. Larger sized combustion chamber modules may also be provided which are typically sized to be multiples of the combustion chamber modules 30, in order to accommodate different effluent streams and/or different effluent stream flows. The same housing 40 can then be used in different situations by simply incorporating the required number and type of combustion chamber modules to suit the effluent stream processing requirements. Should not all of the processing capacity be required, then combustion chamber modules may simply be omitted and replaced instead with blanking modules in place of the unrequired combustion chamber modules. The blanking modules may be provided with a foraminous surface which typically conveys either combustion reagents (such as fuel and an oxidant) for combustion thereon or a purge gas (such as nitrogen) to prevent the accumulation of particulates, powder or condensates on the blanking modules.

Figures 4, 5:
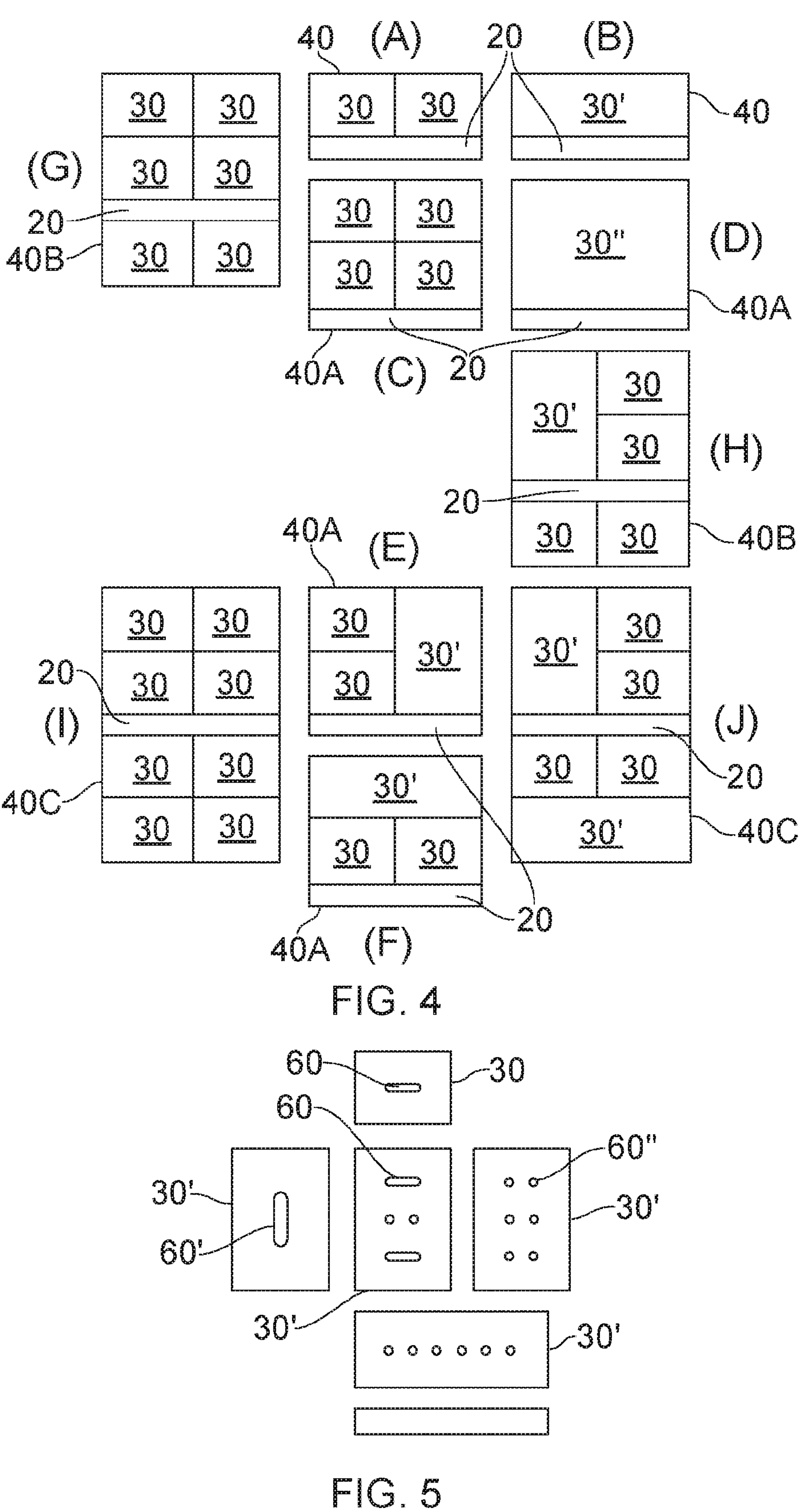
FIG. 5 illustrates different inlet feed configurations for the inlets of the combustion chambers.

FIG. 5 illustrates different inlet feed configurations for the inlets 60 of the combustion chambers 30, 30'. As can be seen, the combustion chamber 30 may have a single, elongate or obround inlet 60 located towards the centre of its combustion chamber 120. The larger combustion chamber 30' may have a single, elongate or obround inlet 60' which is larger than the inlet 60 located towards the centre of its combustion chamber 120, multiple inlets 60, multiple smaller round inlets 60" and or combinations of the above to suit requirements.

Figure 6:
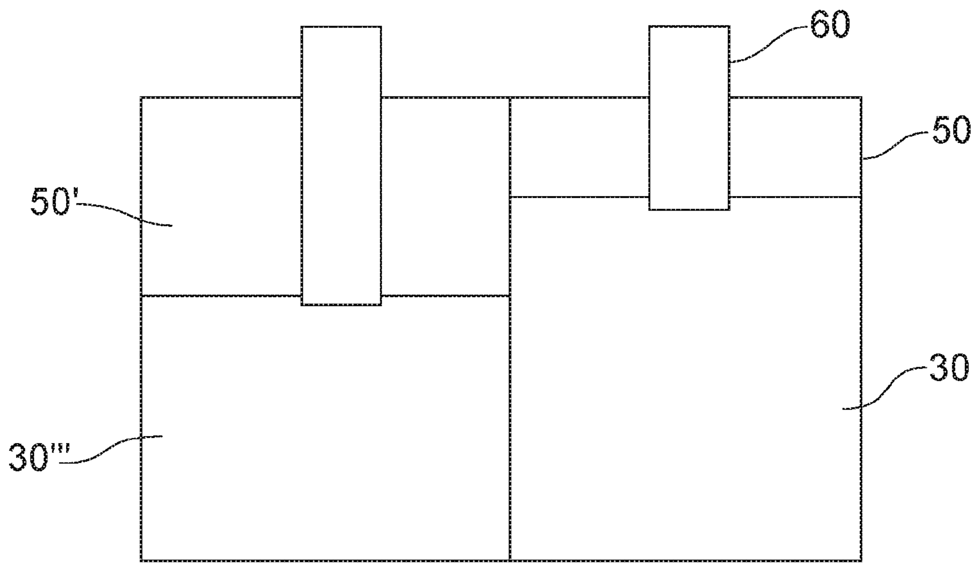
FIG. 6. is a schematic side view of an adjacent pair of differing length combustion chamber modules.

As can be seen in FIG. 6, which is a schematic side view of an adjacent pair of combustion chamber modules, one of the combustion chamber modules 30''' is shorter in the direction of flow of the effluent stream and its mount 50' is consequentially taller, in order that both combustion chambers discharge at the same location into the downstream weir 170.

Hence, it can be seen that a standard housing can be selected and the required combination of combustion chamber modules 30 installed together with an optional pilot module 20 to suit the expected types and flow rates of effluent stream to be processed using a number of standardized parts. In operation, each combustion chamber module 30 receives its own effluent stream as well as its own treatment materials. Each individual combustion chamber module 30 can then be controlled and ignited from the pilot module 20 independently, together or in groups, as required. This enables some combustion chamber modules 30 to be put into idle when no effluent stream is to be processed by that combustion chamber module 30 while other combustion chamber modules 30 may remain functional.

Some embodiments provide a thermal treatment system with the ability to treat gases from a wide variety of applications in the same device by utilizing different combustion chamber modules. Modules share a common architecture making it easy to customize assemblies and modify them to keep up with changing technology upstream. Modules and overall system dimensions can vary greatly based on the process requirements. Modules share downstream gas handling components increasing the cost effectiveness and reducing the complexity of the system. In this design the modules fit into a larger plenum. The advantage to the common plenum is that it vacuum seals the assembly which simplifies the burner interface.

In addition: a common architecture allows the system to be constructed to match many applications by selecting the correct modules; a common architecture allows cost effective modifications of existing systems to meet new specifications; the system footprint is greatly reduced due to increased packing density of tessellated modules; separate burner mounts/plenums allows for cost effective replacement of burner modules; a separate pilot module provides ignition and flame proving; individual modules can be housed in a common plenum, vacuum sealed at the top and bottom; the interface connections at the top of the system reduces foot print; common downstream gas handling components increases the cost effectiveness and reduces complexity of the system.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A modular abatement apparatus for abatement of an effluent stream from a semiconductor processing tool, comprising:

a housing defining a common housing chamber;

a plurality of combustion chamber modules, each combustion chamber module comprising a module housing, and each combustion chamber module positionable within said common housing chamber for treating said effluent stream, each combustion chamber module containing a foraminous sleeve defining a combustion chamber therewithin and wherein said plurality of combustion chamber modules are releasably retainable within said common housing chamber.

2. The modular abatement apparatus of claim 1, wherein at least one combustion chamber module is shaped and dimensioned to occupy a module cross-sectional area and said common housing chamber is shaped and dimensioned to extend across at least a plurality of said module cross-sectional areas.

3. The modular abatement apparatus of claim 2, wherein said common housing chamber is shaped and dimensioned to extend across said plurality of said module cross-sectional areas and a pilot module cross-sectional area.

4. The modular abatement apparatus of claim 2, wherein said common housing chamber comprises a head-plate defining an upstream surface of said housing chamber, said head-plate having a plurality of effluent stream inlets, each positioned towards a center of a corresponding module cross-sectional area.

5. The modular abatement apparatus of claim 2, wherein each combustion chamber module is shaped and dimensioned to occupy a multiple of said module cross-sectional area.

6. The modular abatement apparatus of claim 2, wherein at least one combustion chamber module is a multiple-sized combustion chamber module shaped and dimensioned to occupy a plurality of module cross-sectional areas.

7. The modular abatement apparatus of claim 1, wherein said plurality of combustion chamber modules are tessellatable within said common housing chamber.

8. The modular abatement apparatus of claim 1, wherein said plurality of combustion chamber modules comprises combustion chamber modules of differing sizes.

9. The modular abatement apparatus of claim 1, wherein each combustion chamber module is positioned away from and surrounding the corresponding foraminous sleeve to define a corresponding combustion chamber plenum which is configured to convey treatment materials from a corresponding treatment material inlet and through the corresponding foraminous sleeve into the corresponding combustion chamber.

10. The modular abatement apparatus of claim 1, wherein each combustion chamber module is tubular.

11. The modular abatement apparatus of claim 1, wherein each combustion chamber module comprises an outlet for conveying a treated effluent stream to downstream processing apparatus.

12. The modular abatement apparatus of claim 11, wherein said common housing chamber comprises walls which are configured to extend around said plurality of plurality of combustion chamber modules, said walls extending from said head-plate to said downstream processing apparatus.

13. The modular abatement apparatus of claim 1, wherein at least one combustion chamber module comprises a combustion chamber mount through which a corresponding effluent stream inlet extends, said combustion chamber mount being dimensioned to reduce an internal length of that combustion chamber compared to other combustion chambers.

14. The modular abatement apparatus of claim 1, comprising at least one blanking module positioned within said common housing chamber adjacent at least one combustion chamber module.

15. A method, comprising:

providing a modular abatement apparatus for abatement of an effluent stream from a semiconductor processing tool;

dimensioning a housing of the abatement apparatus defining a common housing chamber;

positioning a plurality of releasably retainable combustion chamber modules within said common housing chamber for treating said effluent stream, each combustion chamber module comprising a module housing and containing a foraminous sleeve defining a combustion chamber therewithin.

* * * * *